March 17, 1925.
D. LYTLE
POTATO DIGGER
Filed March 11, 1924
1,530,005
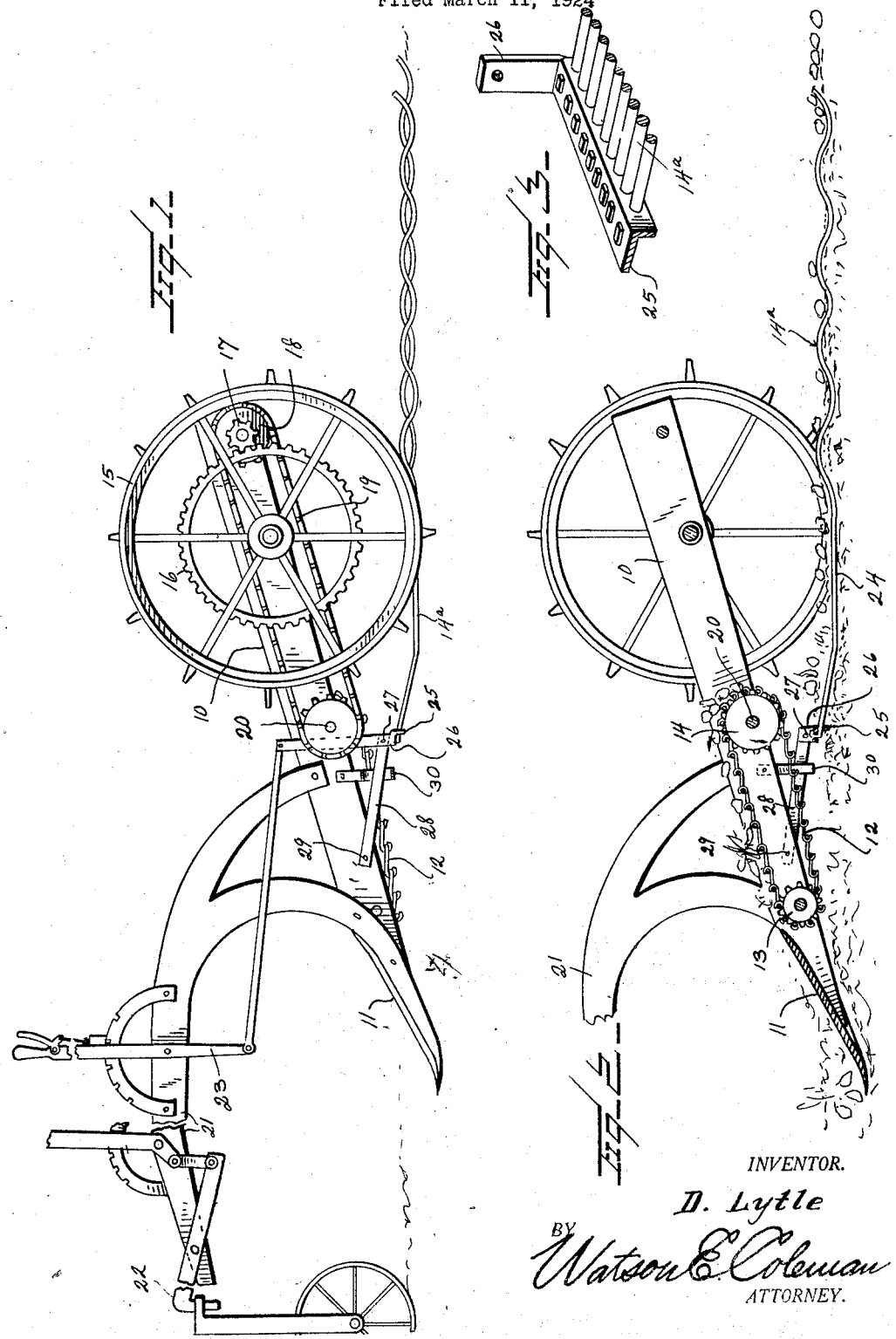
INVENTOR.
D. Lytle
BY Watson E. Coleman
ATTORNEY.

Patented Mar. 17, 1925.

1,530,005

UNITED STATES PATENT OFFICE.

DOUGLAS LYTLE, OF MONTROSE, COLORADO.

POTATO DIGGER.

Application filed March 11, 1924. Serial No. 698,485.

*To all whom it may concern:*

Be it known that I, DOUGLAS LYTLE, a citizen of the United States, residing at Montrose, in the county of Montrose and State of Colorado, have invented certain new and useful Improvements in Potato Diggers, of which the following is a specification, reference being had to the accompanying drawings.

This invention relates to potato diggers, and particularly to that class of potato diggers in which there is a wheeled supporting frame, a plow or blade which breaks the ground and raises the potato, and an elevator or conveyor which carries the potatoes rearward.

In the cultivation of potatoes under the present exigencies of the market, it is particularly necessary that the potatoes shall not be bruised, as bruised potatoes will not bring the same market price as more perfect potatoes, and this is particularly true with regard to seed potatoes and potatoes shipped in hot weather. Most of the potato diggers used today are built with the sole idea apparently of getting the potatoes out of the ground and separating them from the soil in the shortest possible way and without regard to bruising the potato. Under these circumstances, the elevator chains are so constructed as to shake and bounce the potatoes about in order to get all the dirt separated from them and in so doing these elevator chains bruise and cut the potatoes. They are also carried so high by the elevator that they drop back to the ground, together with the large clods and stones and are thereby bruised. Inasmuch as disease starts wherever the potatoes have been bruised, broken or cut, it is particularly necessary that the potatoes shall not be bruised or cut in getting them from the ground.

The general object, therefore, of my present invention is to provide a potato digger with an attachment for the purpose of catching the potatoes and preventing their becoming bruised and yet separate the potatoes from the soil and leave them on top of the ground where they may be readily gathered, which is so constructed that the most of the separation is done after the potatoes leave the conveyor, inasmuch as any effort to shake the soil or clods through the conveyor will act to bruise the potatoes.

A further object is to provide an attachment which will permit the use of a wide blade, the use of an elevator to carry the potatoes rearward and partially rid them of soil, and to provide an attachment which will complete the separation of the dirt from the potato and which, with the conveyor, is so formed that the potatoes will be discharged upon the attachment from a relatively low height, the attachment being further so formed that it will extend horizontally on the ground and drag thereon and will not clog, the friction of the ground keeping it clean.

A still further object is to provide an attachment of this character comprising a plurality of approximately parallel iron rods upwardly inclined at their ends and preferably of different lengths, which rods are of resilient material and, therefore, elastically supported and which will be buried in the loose dirt that drops through the riddle at the point where the potatoes drop on the rods, there being enough soil passing over the riddle or conveyor onto the rods as to provide an earth cushion, as it may be called, upon which the potatoes will fall so as to prevent any bruising, cutting or other damage to the potatoes.

Another object is to provide an attachment of this character which is very simple, which may be readily attached to the ordinary forms of potato diggers, and which will require but a minimum change in the potato diggers as customarily employed, this change being principally in the shortening of the conveyor chain or riddle so as to prevent too much dirt being separated from the potato before the potato drops upon the fingers.

Still another object is to provide an attachment adapted to be applied to a potato digger with the changes above mentioned and readily removed therefrom, this attachment being hinged to the frame of the potato digger so that it may rise and fall to permit the trailing rods before referred to to rest upon and follow the contour of the ground, and means being provided to limit the downward movement of the attachment when the plow and other allied parts are being raised to turn around at the end of a row.

Other objects will appear in the course of the following description.

My invention is illustrated in the accompanying drawings, wherein:—

Figure 1 is a side elevation of a potato digging machine constructed in accordance with my invention;

Figure 2 is a fragmentary longitudinal sectional view thereof;

Figure 3 is a perspective view of the butt ends of the rods 14$^a$, showing the manner in which they are mounted.

Referring to these drawings, it will be seen that I have illustrated a conventional potato digger of the character commonly found on large farms or like places, and in these drawings 10 designates the frame of the potato digger, and 11 the plow thereof, which plow is relatively wide and discharges onto a combined elevator and conveyor composed of the endless chains 12 and the front and rear sprocket wheels 13 and 14 respectively. This endless conveyor 12 may be formed in any suitable manner as, for instance, by a plurality of flexibly engaged links, as is usual in potato diggers of this character. The conveyor is relatively short and the rear end of the conveyor is disposed but a relatively slight distance above the ground so that the potatoes when they drop onto my attachment will not be bruised. The potatoes pass over the rear sprocket wheels 14 of the conveyor and drop down onto my attachment.

This attachment comprises a plurality of spring steel rods or fingers, the rods being designated 14$^a$, which extend rearward from the machine and which are attached to the frame of the machine, as will be later stated. Mounted upon the frame 10 are the driving wheels or traction wheels 15 having the usual lugs or teeth whereby they may obtain traction on the ground. The wheel 15 has mounted in connection with it the gear wheel 16, which in turn meshes with the pinion 17. On this shaft is mounted a sprocket wheel 18, from which a sprocket chain 19 extends to a sprocket wheel on a shaft 20 of the sprocket wheels 14. Thus the conveyor 12 is operated as the machine is drawn along the field.

Machines of this character are commonly drawn by means of a beam 21 whose foot is connected to the plow or blade 11, and the forward end of this beam may be connected directly to a tractor or be connected with means whereby the forward end of the beam may be raised or lowered. This is a common connection found on a large number of potato diggers on the market and forms no part of my present invention. By lifting the forward end of the attachment through the means above described but not illustrated in my drawing, the plow may be withdrawn from the ground to permit the machine to turn corners as, for instance, at the end of a row.

My attachment comprises a plurality of rods 14$^a$. Each of these rods is attached at its rear end to a transverse bar 25 and each rod extends downward and rearward, as at 24, and then extends straight rearward and is then somewhat sinuous in form vertically so that the material dropped on the rod is alternately raised and lowered, the terminal ends of the rods extending upward to the surface of the ground. The rods are alternately long and short and are disposed with their forward ends extending through a transversely extending supporting bar 25, the vertical flange of which is perforated for the passage of these rods and the horizontal flange of which is perforated so as to receive the angularly bent terminal ends of these rods which are riveted above the bar. I do not wish to be limited to this, as it is obvious that the attachment might be made in other ways without departing from the spirit of the invention.

The ends of this angular bar 25 are angularly bent to form arms 26, these arms being perforated for the passage of transverse pivot pins 27 whereby these pins are pivoted to a pair of links 28, the forward ends of these links being pivoted, as at 29. One of the arms 26 is pivotally connected to the link extending from lever 23 so that as this lever is operated the attachment will be caused to rise. The links 28 operate in slotted guides 30 which limit the downward movement of the attachment so as to prevent it dropping too far when the mechanism is being raised in order to turn around at the end of a row.

The conveyor 12 is relatively short and disposed at its rear end at a relatively short distance above the fingers or rods 14. These are relatively long. If the conveyor were long, too much earth would be detached from the potatoes and the potatoes would be bounced and jounced about upon the conveyor, together with the clods or stones too large to pass between the links of the conveyor which would cause the bruising of the potatoes. If the elevator is short but inclined at a high angle, the distance between the rear end of the conveyor and the longitudinally extending rods 14$^a$ would be relatively great and as a consequence the potatoes would fall too great a distance and would be liable to become bruised and injured not only by striking the ground but by the fall of stones and clods from the elevator upon the potatoes and the potatoes thus become bruised and injured for commercial purposes. By providing a short conveyor, however, only a relatively small amount of dirt is separated from the potatoes so that a large amount of partly broken earth and the potatoes are discharged over the tail end of the conveyor and fall only a relatively short distance onto the fingers. The earth which is detached from the potatoes and so discharged forms a bed or cushion upon which the potatoes drop and the earth which still clings to the potatoes forms a protection around the potatoes so that thus when the potatoes drop they will not be bruised or otherwise injured. The fingers or rods 14ª are upwardly inclined at their forward ends so as to ride through the loose earth discharged from the rear end of the conveyor and thus the rods 14ª rearward of this forward upwardly inclined portion will be beneath the surface of the soft earth nearly the length of the rods or fingers so that the potatoes do not come in direct contact with the spring fingers or rods 14ª when they drop down but strike the earth beneath which the fingers or rods run and thus are prevented from being bruised and then the several sinuosities of the fingers alternately raise and depress the potatoes so that by the time the potatoes reach the ends of the fingers they have been worked out upon the surface of the ground and the dirt which ordinarily will cling to the potato has been to a large extent detached. It will be understood that because the rods or fingers 14ª move beneath the surface of the broken-up earth discharged from the conveyor, the friction of the fingers or rods with the ground forming the bottom of the furrow will hold the potatoes, clods and stones as the machine moves forward and that the potatoes and clods which are supported upon the fingers or rods but cannot pass through the same will be held from any movement forward with the fingers, as would occur did these fingers not travel upon the surface of the ground.

I claim:—

1. A potato digger including a wheeled supporting frame, a shovel mounted thereon, an upwardly and rearwardly extending conveyor upon which the shovel discharges, the rear end of the conveyor being at a relatively short distance above the surface of the ground, and a separator traveling upon the ground and having its forward end disposed beneath the rear end of the conveyor, the conveyor discharging upon this separator, the separator being flexibly supported at its forward end to permit the separator to have free vertical movement upon the ground.

2. In a potato digger, a wheeled supporting frame, a shovel mounted thereon, an upwardly and rearwardly inclined conveyor upon which the shovel discharges, said conveyor being formed of open links through which earth may fall, the rear end of the conveyor being disposed a relatively slight distance above the ground, and a separator pivotally supported at its forward end upon the frame and having its forward end disposed below the rear end of the conveyor, the separator being disposed on an approximate level with the ground and extending rearwardly and traveling upon the ground, the forward end of the separator being disposed at a slight angle to that portion of the separator rearward of the forward end.

3. A potato digger comprising a wheeled supporting frame, a shovel mounted thereon, an endless conveyor upon which the shovel discharges composed of a series of connected links permitting the discharge of earth through the conveyor, said conveyor carrying the material discharged by the shovel rearwardly and upwardly, a separator including a plurality of longitudinally extending rods spaced a slight distance from each other, the separator being disposed approximately on a level with the point of engagement between the ground and the wheels, the forward ends of said rods being disposed beneath the rear end of the conveyor and receiving material therefrom, the forward ends of the rods being so connected to the frame as to permit the rods to travel over and conform to the contour of the ground and the rear end of the elevator being spaced a relatively slight distance from said rods.

4. A potato digger including a wheeled supporting frame, a shovel mounted thereon, an upwardly and rearwardly extending endless conveyor upon which the shovel discharges, a separator comprising a plurality of approximately parallel rods operatively pivoted at their forward ends to the frame to thereby permit the rods in their travel to conform to the surface of the ground and rest at all times thereon, means operatively engaged with the wheels of the frame for causing the operation of the endless conveyor, and manually operable means whereby the separator may be bodily raised off of the ground.

5. A potato digger including a wheeled supporting frame, a shovel mounted thereon, an upwardly and rearwardly extending endless conveyor upon which the shovel discharges, a separator associated therewith and comprising a plurality of approximately parallel rods normally resting upon the ground and having their forward ends inclined upward and forward and disposed beneath the rear end of the conveyor to receive material discharged therefrom, means pivotally supporting the forward ends of the rods whereby the rods may travel upon and conform to the ground, the rear end of the elevator being disposed but a relatively slight distance above the forward ends of the rods, means for driving the conveyor, and manually operable means for raising all of the rods simultaneously from the ground.

6. A potato digger comprising a wheeled supporting frame, a shovel mounted thereon, an endless conveyor upon which the shovel discharges, a separator comprising a plurality of approximately parallel rods traveling upon the ground and at their forward ends being upwardly inclined and operatively connected to the frame to permit vertical movement of the rods whereby the rods may conform to the contour of the ground, said rods toward their rear ends being vertically sinuous, the rear end of the conveyor being disposed but a relatively slight distance above the ground and the forward ends of the rods.

7. A potato digger comprising a wheeled supporting frame, a shovel mounted thereon, an endless conveyor mounted upon the frame and consisting of a plurality of relatively open links whereby to permit earth to be discharged between the links of the conveyor, the rear end of the conveyor being disposed but a relatively slight distance above the ground, and a separator comprising a series of fingers formed of rods, the fingers being horizontally disposed and dragging on the ground, the forward ends of the fingers being slightly inclined upward and being disposed below the rear end of the conveyor and spaced but a slight distance therefrom and said fingers being vertically sinuous.

8. A potato digger including a wheeled supporting frame, an upwardly and rearwardly extending shovel mounted thereon, an upwardly and rearwardly extending endless conveyor mounted upon the frame rearward of the shovel and upon which the shovel discharges and being composed of open links whereby fine earth thereon will drop through between the links onto the ground, the rear end of the conveyor being disposed but a slight distance above the level of the ground, means operatively connected to the wheels of the frame whereby the conveyor may be driven, a transversely extending bar pivotally mounted upon the frame below the rear end of the conveyor, rearwardly extending fingers mounted upon said bar disposed at the same level as the ground and adapted to ride thereon, said fingers at their forward ends being upwardly inclined and disposed beneath the rear end of the conveyor, and manually operable means mounted upon the frame whereby all of the fingers may be raised or lowered together.

9. A potato digger including a supporting frame having ground engaging means, a shovel mounted thereon, an upwardly and rearwardly extending conveyor upon which the shovel discharges, the rear end of the conveyor being at a relatively short distance above the surface of the ground, and a separator adapted to travel upon the ground and having its forward end disposed beneath the rear end of the conveyor, the conveyor discharging upon this separator, the separator being flexibly supported at its forward end, permitting the separator to have free vertical movement, the rear end of the separator being upwardly inclined to thereby carry the potatoes to the surface of the ground.

10. In a potato digger, a supporting frame having ground engaging members, a shovel mounted thereon, means receiving material from the shovel and conveying this material rearwardly and separating the loose earth from the potatoes and larger clods, the separator having its forward end operatively connected to the frame beneath the rear end of the conveyor and receiving material discharged from the conveyor and including longitudinally extending rods adapted to ride through the loose earth discharged from the conveying means, the rods being so spaced from each other as to support potatoes thereon, the rods extending upward toward their rear ends to thereby carry the potatoes to the surface of the ground.

11. A potato digging machine having a separator comprising longitudinally extending fingers adapted to travel through the loose earth on the surface of the ground, the forward ends of said fingers being maintained at a slight elevation above the level of the loose earth and the rear ends of the fingers extending upwardly above said loose earth whereby material supported by said fingers is caused to travel rearward relative to the fingers by friction of the ground and the potatoes to be elevated above the surface of the loose earth.

In testimony whereof I hereunto affix my signature.

DOUGLAS LYTLE.